United States Patent [19]

Walters et al.

[11] 4,404,637
[45] Sep. 13, 1983

[54] PROCESS CONTROL SYSTEM

[75] Inventors: John O. Walters; William B. Bard, both of Bartlesville, Okla.

[73] Assignee: Phillips Petroleum Company, Bartlesville, Okla.

[21] Appl. No.: 258,969

[22] Filed: Apr. 30, 1981

[51] Int. Cl.³ .................... G05B 15/00; F01D 17/02
[52] U.S. Cl. .................... 364/494; 364/140; 364/153; 415/15
[58] Field of Search ............... 364/148, 140, 153, 172, 364/173, 174, 175, 494, 495, 118, 110, 155, 142; 415/15; 60/663, 660

[56] References Cited

U.S. PATENT DOCUMENTS

| | | | |
|---|---|---|---|
| 3,515,860 | 6/1970 | Fitzgerald, Jr. ..................... | 364/155 |
| 4,029,255 | 6/1977 | Heiser et al. ........................ | 364/494 |
| 4,053,746 | 10/1977 | Braytenbah et al. ................ | 364/494 |
| 4,090,065 | 5/1978 | Braytenbah et al. ................ | 364/494 |
| 4,143,415 | 3/1979 | Klingbeil ........................... | 364/153 |
| 4,158,226 | 6/1979 | Struger et al. ...................... | 364/142 |
| 4,205,380 | 5/1980 | Braytenbah ........................ | 364/494 |
| 4,246,491 | 1/1981 | Waldron et al. .................... | 364/494 |
| 4,344,128 | 8/1982 | Frye .................................... | 364/153 |
| 4,360,882 | 11/1982 | Stewart et al. ..................... | 364/494 |

Primary Examiner—Mark E. Nusbaum
Assistant Examiner—William G. Niessen

[57] ABSTRACT

A variable limit is utilized to prevent a position controller which requires a velocity set point signal from overdriving a stuck control valve. Control based on a comparison of the actual position to desired position is utilized unless the valve is stuck. If the valve is stuck, the variable limit controls the velocity set point provided to the position controller until such time as the valve becomes unstuck.

8 Claims, 1 Drawing Figure

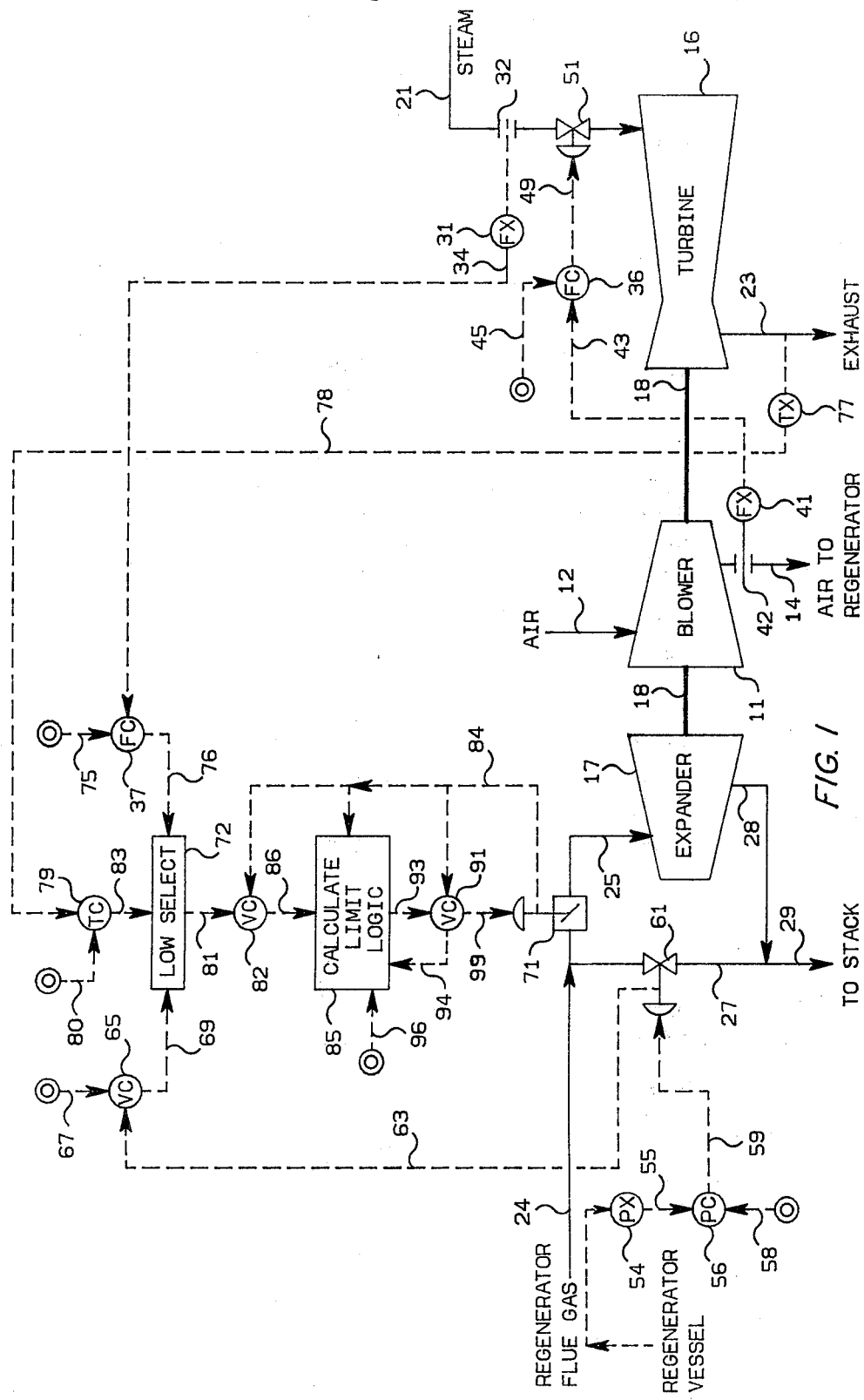

PROCESS CONTROL SYSTEM

This invention relates to process control. In one aspect this invention relates to method and apparatus for controlling a process in which power is supplied to a device for increasing the pressure of a gas by both a turbine or motor and the expansion of a process gas. In another aspect this invention relates to method and apparatus for preventing a controller which requires a velocity set point signal from overdriving a stuck valve.

The terms "velocity" and "position" are commonly utilized in the control systems art to describe two different types of controllers or signals. A velocity controller is a controller which outputs a signal which is representative of a change required in a value such as the position of a device such as a control valve. A position controller is a controller which outputs a signal which is representative of a required value such as the position of a device such as a control valve. In like manner, a velocity signal is a signal which is representative of a change in a value while a position signal is representative of the actual value required. This invention relates particularly to velocity controllers or controllers which require a velocity set point signal.

Devices for increasing the pressure of a gas, such as compressors and air blowers, are commonly utilized in many processes to increase the pressure of a gas for use in the process. A turbine or motor is generally utilized to start up a pressure increasing device and supply at least a portion of the power required to run the pressure increasing device. However, the use of high pressure steam, combustion of a fuel or electricity to drive a turbine or motor results in high compression cost which may have an adverse effect on the economic viability of the process. This problem may be at least partially overcome if a process gas stream under pressure is available for expansion. The expansion of the process gas stream can be utilized to supply power to drive the pressure increasing device.

As used herein, the term "process gas" refers to any gas stream which is either used by or produced by the process. Generally, only waste gas streams such as flue gases or gas streams flowing out of a reactor or other process equipment are "available for expansion". However, any process gas stream which can be reduced in pressure without adversely affecting the process may be utilized to drive the pressure increasing device if desired.

When a process gas stream is available for expansion, it is desirable to utilize the process gas stream as fully as possible. However, care must be taken to not drive the pressure increasing device exclusively with the process gas in such a manner that the driving force supplied to the turbine or motor (referred to hereinafter as a "secondary driving means") is reduced to a point where control is lost of the turbine or motor. It is thus an object of this invention to provide method and apparatus for controlling a process in which power is supplied to a device for increasing the pressure of a gas both by a secondary driving means and the expansion of a process gas in such a manner that maximum utilization is made of the process gas without allowing the driving force applied to the secondary driving means to go below some low limit.

Control valves utilized in process control may remain in the same position for a long period of time. If not moved periodically the control valves may have a tendency to stick when it is desired to move the control valves. This tendency is enhanced if particles are present in a fluid flowing through the control valve.

If the control valve is under automatic control and sticks when a change in the set point is made, a dangerous situation may occur. If the controller providing the control signal to the control valve is a position controller which requires a velocity set point signal, the integral portion of the control signal will continue to increase and apply pressure to the control valve because the error will not be reduced when the control valve is stuck. This may create a situation in which sufficient force may be placed on the control valve to cause the control valve to go completely open or completely shut when the control valve does become unstuck. It is thus another object of this invention to provide method and apparatus for preventing a position controller which requires a velocity set point signal from overdriving a stuck control valve.

In accordance with the present invention, method and apparatus is provided in which a variable limit is utilized to prevent a position controller which requires a velocity set point signal from overdriving a stuck control valve. The velocity set point signal may be derived from a comparison of the actual position of the control valve to the desired position of the control valve using a velocity controller. Control is based on the output of the velocity controller if the valve is not stuck. However, if the valve becomes stuck, the variable limit controls the velocity set point signal supplied to the position controller until such time as the valve becomes unstuck. This prevents a situation from being created in which sufficient force is placed on the control valve to cause the control valve to go to a completely open or completely shut position when the control valve does become unstuck thus avoiding a dangerous situation.

Also in accordance with the present invention, the control valve which is subject to sticking and which is controlling the flow of a process gas to the expander is manipulated in response to the output from the position controller which requires a velocity set point signal so as to substantially maximize the flow of the process gas to the expander while holding the bypassing of the process gas around the expander to some desired minimum level unless the driving force applied to the secondary driving means driving the device for increasing the pressure of a gas goes below a desired minimum level. If the driving force applied to the secondary driving means goes below some minimum point, then the control valve controlling the flow of process gas to the expander is manipulated in response to the output from the position controller so as to insure that the driving force applied to the secondary driving means does not go below the minimum point. In this manner, use of the process gas is maximized while insuring that at least a desired minimum driving force is applied to the secondary driving means which results in improved process economics.

Other objects and advantages of the invention will be apparent from the foregoing brief description of the invention and the claims as well as the detailed description of the drawing. A brief description of the drawing is as follows:

FIG. 1 is a diagrammatic representation of an air blower driven both by a turbine and an expander and an associated control system.

The invention is described in terms of the use of an air blower to supply air to a catalyst regenerator associated with a fluid catalytic cracker unit and is also described in terms of utilizing the large volume of flue gas flowing from the catalyst regenerator to drive the expander. However, the invention is applicable to any process in which a device for increasing the pressure of a gas may be driven both by a secondary driving means and an expander and in which it is desired to maximize the use of the expander.

The invention is also described in terms of using a steam driven turbine as the secondary driving means. However, the invention is applicable to the use of any other suitable type of driving means such as an electric motor or fuel fired turbine. Since the invention is described in terms of a steam driven turbine, the flow of steam to the turbine provides a convenient measurement of the driving force applied to the turbine. Other indications of the driving force applied could be utilized and would be utilized if another form of power is utilized to drive the turbine or a different type of secondary driving means is utilized.

The variable limit control for a stuck valve is illustrated and described in terms of a butterfly valve located in the line supplying the regenerator flue gas to the expander. This type of valve has a particular tendency to stick especially when particles are present in the gas such as would be present in the flue gas from the catalyst regenerator. However, the variable limit control for a stuck valve is applicable to any type of control valve which may have a tendency to stick.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from pressure sensors or flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also transducing of signals from analog form to digital form or digital form to analog form as required is not illustrated since this is also well known.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The term "signal" as used herein generally refers to electrical currents or pneumatic pressures. However, if a digital computer is utilized to implement a part of the control system, the term signal is also meant to refer to binary representations of calculated or measured values.

The position controllers shown may utilize the various modes of control such as proportional, proportional-integral, proportional-derivative, or proportional-integral-derivative. In this preferred embodiment, a proportional-integral-derivative position controller is utilized but any position controller capable of accepting a velocity set point signal and a processes variable signal and producing a scaled output signal, representative of a comparison of the two input signals, is within the scope of the invention. The operation of proportional-integral-derivative controllers is well known in the art. The output control signal of a proportional-integral-derivative controller may be represented as $$S = K_1 E + K_2 \int E\,dt + K_3 dE/dt \qquad (1)$$

where
  $S$ = output control signal;
  $E$ = difference between two input signals;
  $K_1$ = proportional gain;
  $K_2$ = integral gain; and
  $K_3$ = derivative or rate gain.

It is noted that a position controller which requires a velocity input will have means for retaining a position set point which was utilized in a previous time period to provide an output signal. The new velocity set point will be added to the old position set point to derive a new position set point which will be compared to the process variable signal to derive the error E.

The velocity controllers shown may also utilize the various modes of control such as proportional, proportional-integral, proportional-derivative, or proportional-integral-derivative. Again, in this preferred embodiment, a proportional-integral-derivative velocity controller is utilized but any velocity controller capable of accepting a set point signal (which may be velocity or position) and a process variable signal and producing a scaled output signal, representative of a comparison of the two input signals is within the scope of the invention. The preferred output for the velocity controllers of the present invention may be represented as $$V = K_P(E_n - E_{n-1}) + K_I(E_n) + K_R(E_n - 2E_{n-1} + E_{n-2}) \qquad (2)$$

where
  $V$ = output control signal;
  $E_n$ = present difference between the input signals;
  $E_{n-1}$ = difference between two input signals one time period earlier;
  $E_{n-2}$ = difference between two input signals two time periods earlier;
  $K_P$ = proportional gain;
  $K_I$ = integral gain; and
  $K_R$ = rate or derivative gain.

Again, it should be noted that if the set point provided to a velocity controller is a velocity set point, the velocity controller will add the velocity set point to the position set point utilized one time period earlier to derive a new position set point which is then compared to the process variable.

The scaling of an output signal by either a position or velocity controller is well known in control systems art. Essentially, the output of a controller may be scaled to represent any desired factor, variable or change. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, some specified temperature or some specified position change.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic final control elements in conjunction with electrical analog and digital signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, there is illustrated an air blower 11. Air is supplied to the suction inlet of the air blower 11 through conduit means 12. Air is supplied from the discharge outlet of the air blower 11 to a catalyst regenerator (not illustrated) associated with a fluid catalytic cracker unit (not illustrated) through conduit means 14. The air blower 11 is driven by both the turbine 16 and the expander 17 by means of the shaft 18 which is integral between the expander and turbine. Steam is supplied to the turbine 16 through conduit means 21 and is exhausted through conduit means 23.

Flue gas flowing from the catalyst regenerator is supplied to the expander 17 through the combination of conduit means 24 and 25. The flue gas flowing from the regenerator will typically be at a temperature of about 1100° F. and at a pressure of about 18 to about 20 psig. A very large volume on the order of 100,000 standard cubic feet per hour of flue gas is generally provided from a catalyst regenerator. A portion of the flue gas flowing through conduit means 24 may be bypassed around the expander 17 through conduit means 27. Gas is withdrawn from the expander 17 through conduit means 28. The combination of the gas flowing through conduit means 27 and the gas flowing through conduit means 28 is provided to a stack through conduit means 29.

The flow transducer 31 in combination with the flow sensor 32 provides an output signal 34 which is representative of the flow rate of the steam flowing through conduit means 21. Signal 34 is provided as an input to the flow controller 37.

The flow transducer 41 in combination with the flow sensor 42 provides an output signal 43 which is representative of the flow rate of the air flowing through conduit means 14. Signal 43 is provided from the flow transducer 41 as the process variable input to the flow controller 36. The flow controller 36 is also provided with a set point signal 45 which is representative of the desired flow rate for the air flowing through conduit means 14.

In response to signals 43 and 45 the flow controller 36 establishes an output signal 49 which is responsive to the difference between signals 43 and 45. Signal 49, which is scaled so as to be representative of the position of the control valve 51 required to maintain the actual flow rate of air through conduit means 14 substantially equal to the desired flow rate of the air, is provided from the flow controller 36 to the control valve 51 which is operably located in conduit means 21 (control valve 51 may be considered as being representative of a governor on the turbine). The control valve 51 is manipulated in response to signal 49 to thereby maintain the actual flow rate of air through conduit means 14 substantially equal to the set point flow rate as represented by signal 45.

The pressure transducer 54 in combination with a pressure sensing device operably located in the catalyst regenerator provides an output signal 55 which is representative of the pressure in the catalyst regenerator. Signal 55 is provided from the pressure transducer 54 to the pressure controller 56. The pressure controller 56 is also provided with a set point signal 58 which is representative of the desired pressure in the catalyst regenerator. In response to signals 55 and 58, the pressure controller 56 establishes an output signal 59 which is responsive to the difference between signals 55 and 58. Signal 59 is provided from the pressure controller 56 to the control valve 61 which is operably located in conduit means 27. Signal 59 is scaled so as to be representative of the position of the control valve 61 required to maintain the actual pressure in the catalyst regenerator substantially equal to the desired pressure as represented by signal 58. The control valve 61 is manipulated in response to signal 59.

Signal 63, which is representative of the position of the control valve 61, is provided as an input to the valve controller 65. Signal 63 will be effectively representative of the actual percent opening of the control valve 61. The valve controller 65 is also provided with a set point signal 67 which is representative of the desired percent opening of the control valve 61. The set point signal 67 is chosen so as to insure that the control valve 61 is maintained in a control range. A preferred value for set point signal 67 is about 10 percent open. If the control valve 61 is much less than 10 percent opened, the response to the control valve becomes one-linear and it is very difficult to further reduce the percent opening of the control valve 61 if such reduction is needed.

In response to signals 63 and 67, the valve controller 65 establishes an output signal 69 which is responsive to the difference between signals 63 and 67. Signal 69 is scaled so as to be representative of the position of the butterfly valve 71 required to insure that the percent opening of the pneumatic control valve 61 does not go below the percent opening represented by the set point signal 67. Signal 69 is provided from the valve controller 65 to the low select 72.

The flow controller 37 is also provided with a set point signal 75 which is representative of the minimum flow rate for the stream flowing through conduit means 21. In response to signals 34 and 75, the flow controller 37 establishes an output signal 76 which is responsive to the difference between signals 34 and 75. Signal 76 is scaled so as to be representative of the position of the butterfly valve 71 which is required to insure that the flow rate of the steam flowing through conduit means 21 does not go below the low flow steam set point represented by signal 75. Signal 76 is provided from the flow controller 37 as an input to the low select 72.

Temperature transducer 77 in combination with a thermocouple which is operably located in the exhaust from the turbine 16 provides an output signal 78 which is representative of the exhaust temperature. This temperature is monitored so as to prevent the steam flow rate from dropping so low that the exhaust temperature exceeds metallurgical limitations. Signal 78 is provided from the temperature transducer 77 as the process variable input to the temperature controller 79. The temperature controller 79 is also provided with a set point signal 80 which is representative of the maximum allowable exhaust temperature. In response to signals 78 and 80, the temperature controller establishes an output signal 83 which is responsive to the difference between signals 78 and 80. Signal 83 is scaled so as to be representative of the position of the butterfly valve 71 which is required to insure that the flow rate of steam flowing through conduit means 21 does not go below a flow rate which would allow the temperature limit for the exhaust to be exceeded. Signal 83 is provided from the temperature controller 79 as an input to the low select 72.

It is noted that the valve controller 65, flow controller 37, temperature controller 79 and pressure controller 56 have been described in terms of position controllers which accept a position set point. Pressure controller 56 could be a position controller which accepts a velocity set point. However, the output signal 59 must be a position output. The controllers 65, 37 and 79 could all be velocity controllers which accept either a velocity or position set point. If controllers 65, 37 and 79 were velocity controllers, then signal 81 would be a velocity signal instead of a position signal which would be provided from the controllers as described.

Signals 69, 76 and 83 are representative of a desired valve position for the butterfly valve 71. Signal 69 may require the butterfly valve to be 80 percent open while the signals 76 and 83 may require the butterfly valve to be 90 and 95 percent open, respectively. Whichever of signals 69, 76 and 83 is representative of the lower percentage is the signal which will be provided from the low select 72 as signal 81 to the valve controller 82 which is a velocity controller. Thus, the butterfly valve 71 will be manipulated so as to insure that only a desired minimum of gas is being bypassed around the expander 17 unless the flow rate of the steam flowing through conduit means 21 begins to be below a flow rate which would cause the limits represented by signals 75 and 80 to be violated. If this condition occurs, then the position of the butterfly valve 71 will be manipulated so as to cut back on the flow of flue gas to the expander and bypass more gas through conduit means 27 so as to require more steam to be supplied to the turbine 16. In this manner, use of the flue gas flowing through conduit means 24 to drive the air blower 11 is substantially maximized while insuring that the flow rate of steam to the turbine 16 does not go below a required minimum flow rate.

Signal 84, which is representative of the actual percent opening of the butterfly valve 71, is provided as an input to the valve controller 91, the valve controller 82, and the calculate limit logic 85. The valve controller 91 is a position controller which requires a velocity set point signal. In response to signals 81 and 84, the valve controller 82 establishes an output signal 86 which is responsive to the difference between signals 81 and 84. Signal 86 is a velocity signal which is representative of the change, if any, which is required in the valve position of the butterfly valve 71 to maintain the actual valve position substantially equal to the desired valve position represented by signal 81. Signal 86 is provided as an input to the calculate limit logic 85.

The output signal 93 provided from the calculate limit logic 85 is a velocity signal. Signal 93 is representative of a desired change, if any, in the position of the butterfly valve 71. Signal 93 is provided as the set point signal to the valve controller 91. As has been previously stated, the valve controller 91 is a position controller which requires a velocity set point signal. The valve controller 91 internally derives a new position set point by adding the value of signal 93 to the position set point utilized one time period earlier. Signal 94, which is representative of the value of the position set point generated by the valve controller 91, is provided as an input to the calculate limit logic 85. Signal 99 is responsive to the difference between signals 84 and 93. Signal 99 is provided from the valve controller 91 as the control signal to the butterfly valve 71.

The calculate limit logic 85 is also provided with signal 96 which is representative of a driving force limit. Signal 96 will generally be in the range of about 10 percent to about 20 percent of the magnitude of the signal which would drive the butterfly valve 71 fully open.

The output signal 93, which has been previously described broadly, is calculated in response to the described input signals. Signal 93 may be represented as $$\Delta A = \begin{cases} P + R - A_{n-1} & \text{when } A_{n-1} + \Delta P > P + R \\ \Delta P & \text{when } P - R \leq A_{n-1} + \Delta P \leq P + R \\ P - R - A_{n-1} & \text{when } A_{n-1} + \Delta P < P - R \end{cases}$$

where
$\Delta A$ = the magnitude of signal 93;
P = the valve position as represented by signal 84;
R = the driving force limit represented by signal 96;
$A_{n-1}$ = the position set point generated by the valve controller 91 one time period earlier; and
$\Delta P$ = the magnitude of signal 86.

Effectively, signal 93 will be equal to signal 86 if the butterfly valve is not stuck. However, if signal 93 were always equal to signal 86 a dangerous situation could occur. As an example, consider a situation in which the desired valve position represented by the position set point signal generated by the valve controller 91 is 95 percent open and the actual valve position of the butterfly valve 71 is 95 percent open. Assume that a change in the magnitude of signal 81 causes the position set point generated by the valve controller 91 to go to 90 percent open. If the valve 71 is stuck, signal 84 will remain at 95 percent open. This will cause signal 94 to continue to decrease to a point where the butterfly valve 71 may go completely shut when it does become unstuck rather than 90 percent open which is desired. This rapid closing of the butterfly valve 71 is dangerous and should be avoided if at all possible.

In accordance with the present invention, the dangerous situation which may be caused by a stuck valve is prevented by utilizing a variable limit. Effectively, signal 93 from the calculate limit logic 85 will be equal to signal 86 if the butterfly valve is not stuck. However, if the butterfly valve is stuck, signal 93 will assume a value which allows pressure to be applied to the butterfly valve 71 but which will prevent the butterfly valve 71 from being overdriven. As an example, consider a situation in which the actual valve position P is equal to 50 percent open. Also assume that R is equal to 10 percent open and thus P+R is equal to 60 percent open and P−R is equal to 40 percent open. Further assume that the set point signal 81 is equal to 50 percent open. Under these conditions, the set point signal generated by the valve controller 91 in response to signal 93 will be equal to 50 percent open. And thus $A_{n-1}$ will be equal to 50 percent open each pass through the calculate limit logic 85.

Now assume that a change in the set point signal is made such that it is desired for the butterfly valve 71 to be 55 percent open. The valve controller 82 will begin to try to open the butterfly valve 71 as will the valve controller 91. The controllers will not attempt to immediately force the butterfly valve to 55 percent open but will attempt to force the butterfly valve 71 to 55 percent open over a period of time. The various signals illustrated in FIG. 1 might assume the values set forth in Table I during a plurality of passes through the control logic.

TABLE I

| Time | P | Set Point | ΔP | ΔA | $A_n$ |
|---|---|---|---|---|---|
| T | 50 | 50 | 0 | 0 | 50 |
| T + 1 | 50 | 55 | 2 | 2 | 52 |
| T + 2 | 50 | 55 | 3 | 3 | 55 |
| T + 3 | 50 | 55 | 3 | 3 | 58 |
| T + 4 | 50 | 55 | 4 | 2 | 60 |
| T + 5 | 50 | 55 | 4 | 0 | 60 |
| T + 6 | 50 | 55 | 4 | 0 | 60 |
| T + 7 | 50 | 55 | 5 | 0 | 60 |

The numbers set forth in Table I have been exaggerated to illustrate the operation of the control logic. As has been previously stated, the control logic is designed to prevent the error seen by the valve controller 91 from increasing past a limit until such time as the valve becomes unstuck. Over a period of time, the integral portion of the output signal 99 will continue to increase and apply pressure to the control valve. However, such increase is very slow because the error is not allowed to continue to increase and thus the danger of a quick increase on the driving force applied to the control valve is effectively prevented.

The invention has been described in terms of a preferred embodiment as is illustrated in FIG. 1. Preferably, at least part of the control components illustrated in FIG. 1 are analog control components while the remainder are implemented on a digital computer. Preferably, the valve controller 65, the flow controller 37, the temperature controller 79, the low select 72, the valve controller 82, and the calculate limit block 85 are implemented on a digital computer which is preferably the OPTROL 7000 Process Computer System manufactured by Applied Automation, Inc., Bartlesville, Okla. Other specific components such as the butterfly valve 71, the pneumatic control valves 61 and 51, flow sensors 32 and 42, flow transducers 31 and 41; flow controller 36; temperature transducer 77; pressure controller 56, pressure transducer 54 and valve controller 91 are each well known, commercially available control components such as are described at length in Perry's *Chemical Engineer's Handbook*, 4th Edition, Chapter 22, McGraw-Hill.

For reasons of brevity and clarity, conventional auxillary equipment which would be associated with the air blower 11, expander 17 and turbine 16 as well as the catalyst regenerator have not been illustrated or described in the above description as they play no part in the explanation of the invention.

While the invention has been described in terms of the presently preferred embodiment, reasonable variations and modifications are possible, by those skilled in the art, within the scope of the described invention and the appended claims.

That which is claimed is:

1. Apparatus comprising:
   a first control valve means for manipulating the flow of a fluid;
   means for establishing a first signal representative of the desired position of said first control valve means;
   means for establishing a second signal representative of the actual position (P) of said first control valve means;
   a velocity controller for comparing said first signal and said second signal and for establishing a third signal which is representative of any change (ΔP) which must be made in the position of said first control valve means in order for said first signal to remain substantially equal to said second signal;
   a position controller which requires a velocity set point;
   means for establishing a fourth signal which is representative of the position set point ($A_n$) generated by said position controller in response to said velocity set point;
   means for establishing a fifth signal which is representative of a driving force limit (R);
   means for establishing a sixth signal representative of the value of said fourth signal one time period earlier ($A_{n-1}$);
   means for calculating said velocity set point (ΔA) for said position controller in response to said second signal, said third signal, said fifth signal and said sixth signal, wherein said velocity set point is represented by $$\Delta A = \begin{cases} P + R - A_{n-1} \text{ when } A_{n-1} + \Delta P > P + R \\ \Delta P \qquad \text{when } P - R \leq A_{n-1} + \Delta P \leq P + R \\ P - R - A_{n-1} \text{ when } A_{n-1} + \Delta P < P - R \end{cases}$$

means for supplying said first signal to said position controller, wherein said position controller compares said first signal and said fourth signal to establish a seventh signal which is representative of the driving force which must be applied to said first control valve means; and means for manipulating said first control valve means in response to said seventh signal.

2. Apparatus in accordance with claim 1 additionally comprising:

means for increasing the pressure of a gas;

an expander means;

a turbine means;

a shaft connecting said expander means, said turbine means and said means for increasing the pressure of a gas;

means for supplying a gas to the suction inlet of said means for increasing the pressure of a gas;

means for supplying gas at a higher pressure from the discharge outlet of said means for increasing the pressure of a gas;

means for supplying a driving force to said turbine means;

means for supplying a process gas through said first control valve means to said expander means;

means for bypassing at least a part of said process gas around said expander means;

a second control valve means for manipulating the bypassing of at least a part of said process gas around said expander means;

means for establishing an eighth signal representative of the actual driving force being applied to said turbine means;

means for establishing a ninth signal repesentative of a low limit on the driving force being applied to said turbine means;

means for comparing said eight signal and said ninth signal and for establishing a tenth signal responsive to the difference between said eighth signal and said ninth signal;

means for establishing an eleventh signal representative of the actual position of said second control valve means;

means for establishing a twelfth signal representative of a low limit on the position of said second control valve means;

means for comparing said eleventh signal and said twelfth signal and for establishing a thirteenth signal responsive to the difference between said eleventh signal and said twelfth signal;

means for establishing a fourteenth signal representative of the temperature of the exhaust from said turbine means;

means for establishing a fifteenth signal representative of the maximum described temperature of said turbine exhaust;

means for comparing said fourteenth signal and said fifteenth signal and for establishing a sixteenth signal responsive to the difference between said fourteenth signal and said fifteenth signal, wherein said first signal is representative of the lower of said tenth, thirteenth and sixteenth signals.

3. Apparatus in accordance with claim 2 additionally comprising:

means for establishing a seventeenth signal representative of the desired flow rate of gas from the discharge outlet of said means for increasing the pressure of a gas;

means for establishing an eighteenth signal representative of the actual flow rate of gas from the discharge outlet of said means for compressing a gas;

means for comparing said seventeenth signal and said eighteenth signals and for establishing a nineteenth signal which is responsive to the difference between said seventeenth signal and said eighteenth signal, wherein said nineteenth signal is scaled so as to be representative of the valve position required to supply the driving force to said turbine means required to maintain the actual flow rate of gas from the discharge outlet of said means for compressing a gas substantially equal to the desired flow rate; and means for manipulating the driving force supplied to said turbine means in response to said twelfth signal.

4. Apparatus in accordance with claim 3 additionally comprising:

means for establishing a twentieth signal representative of the actual pressure of said process gas;

means for establishing a twenty-first signal representative of the desired pressure of said process gas;

means for comparing said twentieth signal and said twenty-first signal and for establishing a twenty-second signal responsive to the difference between said twentieth signal and said twenty-first signal, wherein said twentieth signal is scaled so as to be representative of the position of said second control valve means required to maintain said twentieth signal substantially equal to said twenty-first signal; and means for manipulating said second control valve means in response to said fifteenth signal.

5. A method for controlling the position of a first control valve in response to the output signal from a position controller which requires a velocity set point signal, said method comprising the steps of:

establishing a first signal representative of the desired position of said first control valve means;

establishing a second signal representative of the actual position (P) of said first control valve means;

comparing said first signal and said second signal and establishing a third signal which is representative of any change ($\Delta P$) which must be made in the position of said first control valve means in order for said first signal to remain substantially equal to said second signal;

establishing a fourth signal which is representative of the position set point ($A_n$) generated by said position controller in response to said velocity set point;

establishing a fifth signal which is representative of a driving force limit (R);

establishing a sixth signal representative of the value of said fourth signal one time period earlier ($A_{n-1}$);

calculating said velocity set point ($\Delta A$) for said position controller in response to said second signal, said third signal, said fifth signal and said sixth signal, wherein said velocity set point is represented by $$\Delta A = \begin{cases} P + R - A_{n-1} & \text{when } A_{n-1} + \Delta P > P + R \\ \Delta P & \text{when } P - R \leq A_{n-1} + \Delta P \leq P + R \\ P - R - A_{n-1} & \text{when } A_{n-1} + \Delta P < P - R \end{cases}$$

supplying said first signal to said position controller, wherein said position controller compares said first signal and said fourth signal to establish a seventh signal which is representative of the driving force which must be applied to said first control valve means; and manipulating said first control valve means in response to said seventh signal.

6. A method in accordance with claim 5 additionally comprising the steps of:

supplying a gas to the suction inlet of a means for increasing the pressure of a gas which is driven by both an expander means and a turbine means;

supplying gas at a higher pressure from the discharge outlet of said means for increasing the pressure of a gas;

supplying a driving force to said turbine means;

supplying a process gas through said first control valve means to said expander means;

bypassing at least a part of said process gas around said expander means through a second control valve means;

establishing an eighth signal representative of the actual driving force being applied to said turbine means;

establishing a ninth signal representative of a low limit on the driving force being applied to said turbine means;

comparing said eight signal and said ninth signal and establishing a tenth signal responsive to the difference between said eighth signal and said ninth signal;

establishing an eleventh signal representative of the actual position of said second control valve means;

establishing a twelfth signal representative of a low limit on the position of said second control valve means;

comparing said eleventh signal and said twelfth signal and establishing a thirteenth signal responsive to the difference between said eleventh signal and said twelfth signal;

establishing a fourteenth signal representative of the temperature of the exhaust from said turbine means;

establishing a fifteenth signal representative of the maximum desired temperature of said turbine exhaust;

comparing said fourteenth signal and said fifteenth signal and establishing a sixteenth signal responsive to the difference between said fourteenth signal and said fifteenth signal, wherein said first signal is representative of the lower of said tenth, thirteenth and sixteenth signals.

7. A method in accordance with claim 6 additionally comprising the steps of:

establishing a seventeenth signal representative of the desired flow rate of gas from the discharge outlet of said means for increasing the pressure of a gas;

establishing an eighteenth signal representative of the actual flow rate of gas from the discharge outlet of said means for compressing a gas;

comparing said seventeenth signal and said eighteenth signals and establishing a nineteenth signal which is responsive to the difference between said seventeenth signal and said eighteenth signal, wherein said nineteenth signal is scaled so as to be representative of a valve position required to supply the driving force to said turbine means required to maintain the actual flow rate of gas from the discharge outlet of said means for compressing a gas substantially equal to the desired flow rate; and manipulating the driving force supplied to said turbine means in response to said twelfth signal.

8. A method in accordance with claim 7 additionally comprising the steps of:

establishing a twentieth signal representative of the actual pressure of said process gas;

establishing a twenty-first signal representative of the desired pressure of said process gas;

comparing said twentieth signal and said twenty-first signal and establishing a twenty-second signal responsive to the difference between said twentieth signal and said twenty-first signal, wherein said twentieth signal is scaled so as to be representative of the position of said second control valve means required to maintain said twentieth signal substantially equal to said twenty-first signal; and manipulating said second control valve means in response to said twenty-second signal.

* * * * *